United States Patent Office 2,807,193
Patented Sept. 24, 1957

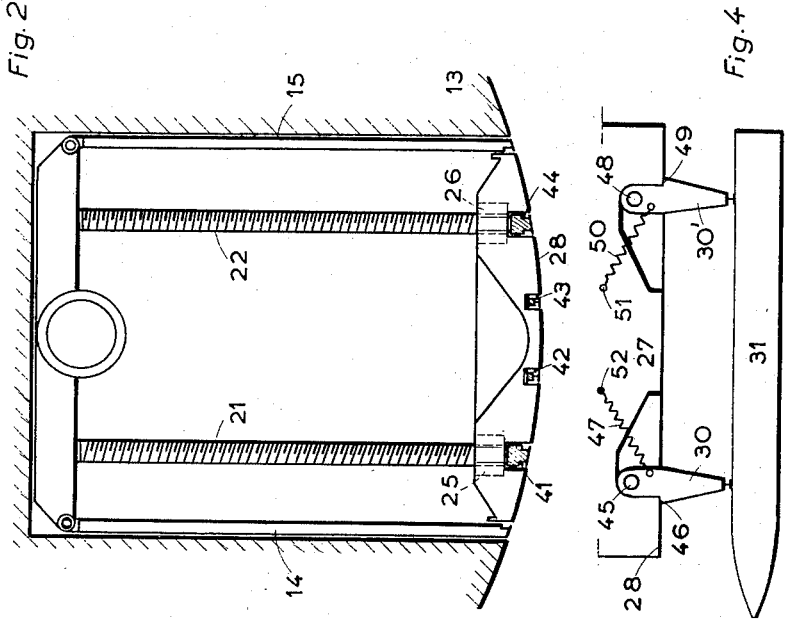

2,807,193

MAGAZINE FOR RELEASABLE LOADS

Roger Aimé Robert, Boulogne-sur-Seine, and Pierre P. Matge, Drancy, France

Application October 4, 1954, Serial No. 460,202

Claims priority, application France November 30, 1953

2 Claims. (Cl. 89—1.5)

This invention relates to a magazine for releasable loads, and is more particularly directed to a magazine for rocket-bombs of the kind released from aircraft.

It is an object of the invention to provide such a magazine which, while providing for the release of the rocket-bombs under optimum conditions of safety and reliability, will not introduce any discontinuity into the contour of the aircraft in which it is located, either in the loaded condition prior to release of the rockets, or in the releasing conditions during firing, or in the unloaded condition after the rockets have been fired therefrom.

It is likewise an object of the invention to provide such a magazine which is free of pivoted trapdoors and the like, and consequently which does not comprise any mechanism for opening and closing such doors, and wherein at the same time the rocket compartments remain effectively sealed both in the loaded and the unloaded conditions of the magazine.

It is a further object to provide a magazine which will be lightweight, simple and economical to construct and reliable in operation.

According to the invention the lower orifice or outlet of a rocket magazine is sealed with a wall adapted to be broken on descent of the rocket or rockets, means being provided for re-sealing said outlet after the rocket or rockets have all been released.

The invention particularly contemplates a form of embodiments wherein the sealing of the bomb release orifice after firing of the rockets is accomplished by the same means as those serving to support the rockets in the magazine.

A clear understanding of the invention will be had from the ensuing description made with reference to the accompanying drawings, wherein:

Fig. 1 is a transverse section of the magazine in loaded condition;

Fig. 2 is a transverse section of the magazine in empty condition;

Fig. 3 is a diagrammatic overhead view; and

Fig. 4 is a diagrammatic view of the rocket support in side elevation.

The improvement of the invention is applicable with advantage to apparatus for the release of rocket-bombs of the kind described in U. S. Patent No. 2,630,740 filed October 22, 1949 by the applicants, and comprising means for directly suspending the rockets from one another in one or more vertical ranks, the uppermost rocket of each rank being suspended from a support which is adapted to be advanced downwardly for successively releasing the rockets of the related rank.

The rocket magazine is disposed in a correspondingly shaped recess 11 formed in the fuselage 12 of an aircraft, the under face of which is shown at 13. Said magazine is of generally parallelopipedic form. It comprises vertical fixed uprights or partitions 14 and 15, sustaining horizontal transversely extending upper beams or girders 16 and 17 one of which is located adjacent to the actuator means 18 provided for advancing the support. Interposed between the upper girders 16 and 17 on the one side and horizontal longitudinally extending lower beams or girders 19 and 20 on the other side are pairs of threaded rods 21 and 22, and 23 and 24 respectively. The said rods are mounted in the girders for rotation about the axes of the rods. Cooperating with the threaded rods are nuts as shown at 25 and 26 for the rods 21 and 22, said nuts being connected with a generally plate-like support 27 which extends over an area substantially equal to the horizontal cross section of the magazine. This support includes an under face 28 which is preferably solid and which is provided with a shape to be specified later. The support is formed with reinforcing ribs and with shoulders or cutouts for the passage of adjacent elements. Mounted on the under face 28 of the support 27 are front arms and rear arms, the said front and rear arms being equal in numbers to that of the ranks of rockets to be supported. Five front arms $30_1$, $30_2$, $30_3$, $30_4$ and $30_5$ have been illustrated in Fig. 1. Suspended from the front and rear arms are the uppermost rockets $31_1$—$31_5$ of the respective ranks, while the next lower rockets are directly suspended from the uppermost rockets 31 and so on, so that the magazine is filled with rockets extending horizontally in each respective vertical rank.

The under orifice or release outlet of the magazine is sealed with a wall 32 made of a material which is strong enough to withstand the stresses which are normally exerted on the skin of an aircraft fuselage, particularly the aerodynamical forces, while yet being weak enough to insure that it will easily be broken through by the lowermost rockets $33_1$, $33_2$, $33_3$, $33_4$, $33_5$ when these rockets are moved down for release. The frangible wall 32 may for example be made from the material known by the trade name "Klegecel" though this statement is not to be interpreted in a restrictive sense. In the example, the wall 32 is subdivided into as many panels as there are ranks of rockets: thus there is a panel 34 interposed between the longitudinal girder 19 and a marginal girder 35; a panel 37 between the longitudinal girder 20 and a marginal girder 38; and a panel 36 which in turn is subdivided into three panels, the one interposed between the longitudinal girder 19 and an intermediate girder 39, another between an intermediate girder 39 and an intermediate girder 40, and the third between the intermediate girder 40 and the longitudinal girder 20. Various other arrangements of the panels may be provided, and particularly there may be provided a single panel forming the wall 32.

With the magazine filled with rockets, and the lower wall 32 of the magazine in position, the rockets are released in the same way as described in the above-mentioned U. S. Patent. When the lowermost rockets $33_1$—$33_5$ hit the panels 34, 36, 37 the panels break up into small harmless fragments and the rockets are fired in succession, the support 27 progressing downwardly owing to the cooperation of the threaded rods such as 21, 22 with the nuts 25 and 26, the movement of the support being produced by rotating the said threaded rods.

After all the rockets in the magazine have been released, the support 27 is in its lowermost position (Fig. 2) and its under face 28 is so formed that in this position it will form an exact extension of the fuselage wall 13, as was previously the case with the frangible wall 32, so that perfect aerodynamical conditions are once again re-established. Cutouts or cavities 41, 42, 43 and 44 are provided in the support 27 for housing the respective girders 19, 39, 40 and 20.

The invention contemplates mounting the arms 30 in retractible manner upon the support 27. For this purpose, a front arm 30 may for example be mounted for rotation about a transverse axis 45 of the support 27. The arm is formed with a forwardly directed shoulder 46 and is biased by a spring 47 attached to a fixed point 52 on support 27. A rear arm 30' is pivoted about a transverse axis 48 and is formed with a rearward shoulder 49 and is biased by a spring 50 anchored to a pin 51 spaced forwardly from arm 30'. When the rocket 31 is suspended from arms 30 and 30' (Fig. 4) the shoulders 46 and 49 are in abutting relation with the under face 28 of the support 27. As soon as the rocket has been released, the arms 30 and 30' retract into corresponding recesses provided therefor in support 27 so that in the empty condition of the magazine, with the under face of the support acting to provide a continuous fuselage contour, the arms 30 and 30' do not project from the face 28 and this face is as smooth as the wall 32.

To re-load the magazine the arms 30 and 30' are withdrawn from out of their recess against the action of springs 47 and 50, a rocket is suspended with its front and rear ends from said arms, then another rocket is suspended from the first, and so on, the support 27 being returned to its uppermost position by rotation of the threaded rods 21 and 22 in a direction reverse from that used in firing the rockets.

What we claim is:

1. For mounting within an aircraft fuselage, in combination: a rocket-bomb magazine, means for suspending a plurality of rocket-bombs in said magazine and comprising a suspending member located towards the top of said magazine, means for advancing said member downwards, and a bottom wall for said magazine, which wall is made of a material breakable by impact of a lowermost rocket-bomb in the magazine during the downward advance of said member, the under surface of said member being so conformed as to provide a continuous surface with adjacent portions of the skin of said fuselage when the suspending member has reached the lowermost position thereof.

2. For mounting in an aircraft fuselage, in combination: a rocket magazine, means for suspending a plurality of rockets in the magazine and comprising a suspending member adjacent the top of the magazine, means for advancing said member downwardly, a bottom wall for said magazine made of material breakable by impact of a lowermost rocket during the downward advance of said member, means providing an under surface of said member so formed as to provide a continuous streamlined surface with adjacent portions of the fuselage skin in the lowermost position of the member, arms supporting an uppermost rocket of the plurality from said suspending member, and means for retracting said arms into said member on release of all the rockets of the plurality.

References Cited in the file of this patent

UNITED STATES PATENTS

| 2,385,051 | Berlin et al. | Sept. 18, 1945 |
| 2,630,740 | Robert et al. | Mar. 10, 1953 |
| 2,763,189 | Grill | Sept. 18, 1956 |

FOREIGN PATENTS

| 798,880 | France | Mar. 11, 1936 |
| 379,505 | Italy | Mar. 28, 1940 |